(12) United States Patent
Barton et al.

(10) Patent No.: US 12,287,303 B2
(45) Date of Patent: Apr. 29, 2025

(54) SACRIFICIAL SENSOR FOR DETERMINING DAMAGE TO A PART

(71) Applicant: BAE SYSTEMS plc, London (GB)

(72) Inventors: Janice Marie Barton, Southhampton (GB); Geir Olafsson, Southampton (GB)

(73) Assignee: BAE SYSTEMS PLC, London (GB)

( * ) Notice: Subject to any disclaimer, the term of this patent is extended or adjusted under 35 U.S.C. 154(b) by 66 days.

(21) Appl. No.: 17/596,146

(22) PCT Filed: May 27, 2020

(86) PCT No.: PCT/GB2020/051272
§ 371 (c)(1),
(2) Date: Dec. 3, 2021

(87) PCT Pub. No.: WO2020/245564
PCT Pub. Date: Dec. 10, 2020

(65) Prior Publication Data
US 2022/0229007 A1 Jul. 21, 2022

(30) Foreign Application Priority Data
Jun. 6, 2019 (GB) .................................. 1908053

(51) Int. Cl.
G01N 27/20 (2006.01)
G01N 27/24 (2006.01)
(52) U.S. Cl.
CPC ............. *G01N 27/20* (2013.01); *G01N 27/24* (2013.01)

(58) Field of Classification Search
CPC .............................. G01N 27/20; G01N 27/24
See application file for complete search history.

(56) References Cited

U.S. PATENT DOCUMENTS

| 5,245,293 A | 9/1993 | Runner |
| 9,329,021 B1 | 5/2016 | DeLuca et al. |
| 2007/0166831 A1 | 7/2007 | Watkins, Jr. et al. |
| 2009/0249885 A1 | 10/2009 | Shkel et al. |
| 2011/0089958 A1* | 4/2011 | Malecki ................ B29C 70/14 |
| | | 428/297.4 |
| 2012/0188078 A1 | 7/2012 | Soles et al. |
| 2018/0306568 A1* | 10/2018 | Holman ................ G06F 3/0414 |

(Continued)

FOREIGN PATENT DOCUMENTS

| CN | 106643461 A | 5/2017 |
| CN | 107328827 A | 11/2017 |
| CN | 110230142 A | 9/2019 |

(Continued)

OTHER PUBLICATIONS

International Search Report and Written Opinion received for PCT Application No. PCT/GB2020/051272. Mail date: Aug. 11, 2020. 17 pages.

(Continued)

*Primary Examiner* — Feba Pothen
(74) *Attorney, Agent, or Firm* — Finch & Maloney PLLC

(57) ABSTRACT

There is provided a sacrificial sensor configured to be coupled with a part and provide an indication of damage in the part, wherein an electrical property of the sacrificial sensor is configured to change as the sacrificial sensor is damaged to indicate damage to the part.

20 Claims, 6 Drawing Sheets

(56) References Cited

U.S. PATENT DOCUMENTS

2020/0191549 A1\* 6/2020 Aitchison ................ G01D 5/16

FOREIGN PATENT DOCUMENTS

| EP | 2950085 A1 | | 12/2015 | |
|---|---|---|---|---|
| JP | 2001153603 A | | 6/2001 | |
| KR | 20140038149 A | \* | 3/2014 | |
| KR | 20180102898 A | \* | 9/2018 | |
| WO | WO-2016175321 A1 | \* | 11/2016 | ........... D03D 1/0088 |
| WO | 2017157605 A1 | | 9/2017 | |
| WO | 2020245564 A1 | | 12/2020 | |

OTHER PUBLICATIONS

GB Search Report under Section 17(5) received for GB Application No. 1908053.0, dated Nov. 29, 2019. 4 pages.
Atalay, Ozgur and Kennon, William Richard, "Knitted Strain Sensors: Impact of Design Parameters on Sensing Properties," Sensors, vol. 14, No. 3, Mar. 7, 2014. pp. 4712-4730.
International Preliminary Report on Patentbility received for PCT Application No. PCT/GB2020/051272. Mail date: Dec. 16, 2021. 10 pages.

\* cited by examiner

SACRIFICIAL SENSOR FOR DETERMINING DAMAGE TO A PART

The present disclosure relates to sensors for determining damage to a part. In particular, the disclosure provides for an early detection of damage in a laminated fibre reinforced polymer structural part.

BACKGROUND

Composite materials, such as polymers reinforced with glass or carbon fibre, have a wide range of uses and usually comprise a layer structure of reinforcing fibres embedded within a polymer matrix. Composite materials are used in many industries, such as aerospace, automotive, power generation and maritime. Component parts made of composite materials provide a relatively high strength and high stiffness material that has a relatively low weight.

Composite parts often require joining to form composite structures, for example, composite materials are often joined to other composite elements or steel components to form structures. One method for joining elements made of composite materials together is by mechanical fastening, such as bolted joints. This requires holes to be drilled through the composite structure, which weakens the materials. Further, the presence of the fasteners introduces additional weight to the structure. The presence of bolts also increases the number of parts within the overall structure, which in turn leads to additional expense, simply due to increased part handling but also due to increased inspection and maintenance requirements.

An alternative method for joining elements is via a bonded joint, for example by using an adhesive between two elements. Adhesively bonded joints require no additional parts and can provide an efficient means of making joints. However, defects can occur in bonded joints during manufacturing or due to service loading. The composite parts will also be subject to stress and strain over their lifetime. The stress may cause defects to occur in the parts, such as structural cracks, delamination of composite materials or failure at a joint. In addition, damage can occur in the adhesive, which can result in defects within the bond.

Various techniques have been used to inspect for potential failures in composite parts.

Visual testing is simple and inexpensive. However, it is reliant on the person conducting the inspection and for the damage to be visible on the surface of the part. Visual testing only provides qualitative results and is reliant on optical properties of the materials at the surface.

Another qualitative inspection technique is the "tap test", which can be used to rapidly inspect large areas, for example by lightly tapping the material and comparing the acoustic response. A well-bonded area typically produces an even pitch sound, compared with a disbanded area which usually produces a dead or dull sound in response to the tap.

Ultrasound inspections may provide a high resolution of possible defects in the part, such as delamination defects, as well as depth information of the defect. However, the ultrasound testing relies on combination of many point measurements, which is relatively time consuming and expensive. Ultrasound also requires a contact and coupling between the ultrasonic testing equipment and the element to be tested. In addition, ultrasound uses time of flight measurements from reflective features. Interface defects are difficult to identify by this means as surface reflections will be indistinguishable from interface defects owing to a similar time of flight value for both. Furthermore, high frequency probes are required when testing composite materials. This limits the probing depth as higher frequencies are more easily attenuated.

Radiography may be used to detect defects in elements and can provide relatively high penetration and resolution. However, penetration is limited in composite materials due to their high X-ray absorptivity. In addition, there is a radiation risk to people on site, which has an associated cost implication to ensure the safety of the nearby people.

Laser shearography enables rapid inspections over a relatively large area of a laminated composite part. However, this inspection method only detects faults resulting from the application of a load sufficient enough to result in an out-of-plane displacement local to a defect. Therefore, the method only detects defects near the surface of the element. Further, the application of load from laser shearography requires contact by additional temporary equipment such as vacuum hoods, causing operational interruption to the inspected component.

Thermography enables rapid non-contact inspections over large areas. However, this method is not useful for detecting defects at depth as the thermal properties of many materials prohibit the conduction of sufficient heat through the thickness of a component.

Electrical resistance strain gauges may be applied to a surface or within the layers of a composite part. An electrical current is passed through the strain gauge and its resistance changes due to local deformation. Strain gauges are a proven and reliable means of measuring strain. However, strain gauges are small, and consequently measurements are made over a small area, providing only point measurements. As the change in strain is localised to the damage site, accurate knowledge of where the damage would occur is required. In addition, placing strain gauges within laminated composite part and adhesive bonds has a deleterious effect on the structural integrity as the gauges and their associated wiring cause stress discontinuities and potentially results in reduction in strength. Therefore, strain gauges are most usually mounted on the surface in structural monitoring/inspection applications. Likewise, optical strain sensors based on fibre optic cables suffer from the same restrictions.

Therefore, there exists a need to provide a test that is able to identify damage in a laminated composite part, that is cheap and does not have an adverse effect on the performance of the part.

SUMMARY

In a first aspect, there is provided a sacrificial sensor configured to be coupled with a part and provide an indication of damage in the part, wherein an electrical property of the sacrificial sensor is configured to change as the sacrificial sensor is damaged to indicate damage to the part. The provision of a sacrificial sensor enables the early detection of damage to the part.

In one example, the electrical property comprises electrical resistance, wherein the electrical resistance is configured to increase as the sacrificial sensor is damaged. Electrical resistance is proportional to the damage of the sensor and so an operator can determine the extent of the damage to the part based on the change in measured electrical resistance.

In another example, the electrical property comprises capacitance.

The sacrificial sensor may be integral with the part. By providing a sacrificial sensor that is integral with the part, then the sensors will not fail and become damaged before the part is damaged.

In one example, the sacrificial sensor has an areal density (or weight) of between approximately 5 gsm and approximately 30 gsm. Providing a lightweight sacrificial sensor means that there will not have an adverse effect on the part that is being monitored.

The sacrificial sensor may comprise a tissue structure. The tissue structure is a lightweight and has a relatively low strain to failure. The sacrificial sensor may comprise silver coated nylon fibres.

According to another aspect, there is provided a system comprising a part to be inspected; and at least one sacrificial sensor, wherein the at least one sacrificial sensor has a lower strain to failure value compared with the strain to failure of the part. Providing at least one sacrificial sensor having a lower strain to failure value compared with the part means that the at least one sacrificial sensor will damage as the part is damaged, so an indication can be provided of damage to the part.

In one example, the part comprises a plurality of sacrificial sensors arranged at various locations on the part to determine the location of the damage of the part. Providing a plurality of sensors enables the specific location of any damage to the element to be identified.

The at least one sacrificial sensor is located in a laminar layer of the composite laminate. The at least one sacrificial sensor may be located in a matrix of the composite laminate. A matrix of a composite laminate part will fail before the fibres of the composite laminate part fail. As the matrix fails, then the sacrificial sensor 108 located in the matrix will also be damaged, which provides an indication of damage to a part, without the fibres of the part being damaged.

In one example, the at least one sacrificial sensor is located within an adhesive at a joint in the part. If adhesive is used in the part, then it is likely that this will fail before the rest of the part fails. As such, providing a sacrificial sensor in the adhesive means that an early indication of damage to the part can be provided.

In a further aspect, there is provided a method of providing an indication of damage in an element, the method comprising: providing a part with at least one sacrificial sensor; providing a voltage potential to the at least one sacrificial sensor; determining a change in the electrical property of the at least one sensor to indicate damage to the part.

Hence a sacrificial sensor has been devised that is able to provide an early indication of damage to a laminated composite part. This enables a user to carry out a timely repair and/or remedial work on the part to enable the part to be strengthened and/or reduce the structural loading to prevent failure. The sacrificial sensor will provide an indication that damage has occurred to a part and will allow a user to act prior to the whole part failing. Therefore, the sensors provide information ahead of possible failures.

The sacrificial sensor is thin and lightweight and has no detrimental effect to the overall strength of the part.

In one example, the sacrificial sensors are modular, which means that small sensors could be used in many different locations in a large structure. Therefore, the sensors could provide information on the location of damage in the large structure. This information is important for damage criticality assessments and aids any detailed inspections which may be required.

BRIEF DESCRIPTION OF THE DRAWINGS

Examples of the present disclosure will now be described with reference to the accompanying drawings, in which.

DETAILED DESCRIPTION

Figure 1A:
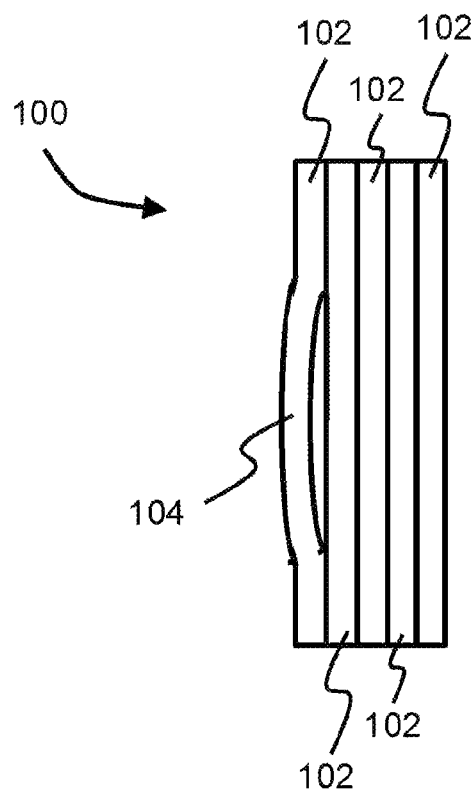
FIG. 1a shows an example of an example of de-lamination of a composite part.

FIG. 1a shows a side view of an example part 100. The example part 100 shown in FIG. 1a is manufactured from a composite material comprising a plurality of laminar layers 102. Each of the layers 102 may be formed of a different material with different physical or chemical properties. Composite materials may be made of a combination of fibres and polymers which results in a part 100 having a high strength and stiffness, with low weight. One example of a composite material is glass fibre.

In use, the part 100 may be subject to stress and deform or become damaged due to the stress. In one example, the part 100 may become damaged due to impact of another object on the part 100. For example, where the part 100 is located in an aircraft, then the part 100 may become damaged if a foreign object, such as a bird, strikes the part 100. In another example, the part may have not been manufactured correctly and as such, an irregularity might be present post manufacturing. This irregularity may not be immediately detected until the part 100 is in use, where a high stress/strain concentration around the irregularity may cause damage to the part 100.

In the example shown in FIG. 1a, one of the layers 102 has become delaminated at a delamination point 104 from the other layers 102. This delamination reduces the strength of the part 100 as the layer 102 that is subject to delamination is not able to transfer load and contribute to the strength of the part as effectively as a non-delaminated layer 102. Under a further application of load, the part 100 may fail due to the decreased strength of the part 100.

Figure 1B:
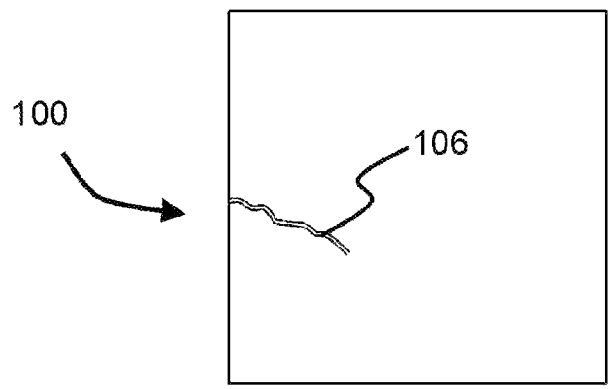
FIG. 1b shows an example of a crack forming in a part.

FIG. 1b shows a side view of another example of a part 100. In this example, the part 100 is subject to a strain, and the part 100 is damaged and/or deformed and a crack 106 has formed in the part 100. In this example, the damage to the part 100 is the crack 106. The presence of a crack in the part 100 reduces the strength of the part 100 and under further stress or if a further load is applied, the part 100 may fail.

Figure 1C:
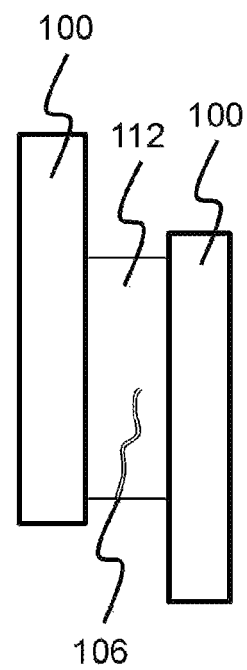
FIG. 1c shows an example of a crack forming in an adhesive.

Deformation and damage of a part 100 may occur at a joint between two sections of the part 100. For example, when two parts 100 are joined together using an adhesive material 112, such as glue, then under stress, one part 100 may begin to de-bond from the other as a result of a loss of integrity of the adhesive, resulting in a reduction in strength of the joint of the part 100. Alternatively, as shown in FIG. 1c, a crack 106 may form in the adhesive 112. Further stress, or the continued application of stress or application of load may result in the failure of the part 100.

Figure 2A:
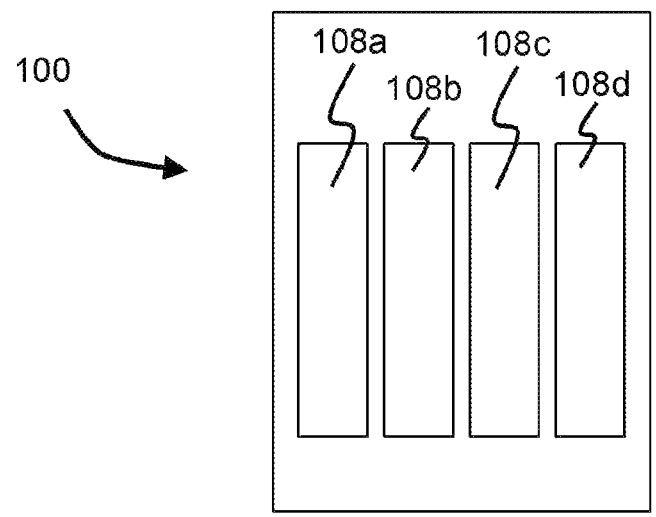
FIGS. 2a and 2b show an example of a part with a plurality of sacrificial sensors applied.

FIG. 2a shows an example part 100 to be inspected, comprising a plurality of sacrificial sensors 108 coupled with the part 100. In the example shown in FIG. 2a, there are four sacrificial sensors 108a-d coupled to the part 100, but in other examples, there may be more or fewer than four sacrificial sensors 108 coupled to the part. The sacrificial sensors 108 are configured to be damaged as the part 100 deforms from its original shape.

Figure 2B:
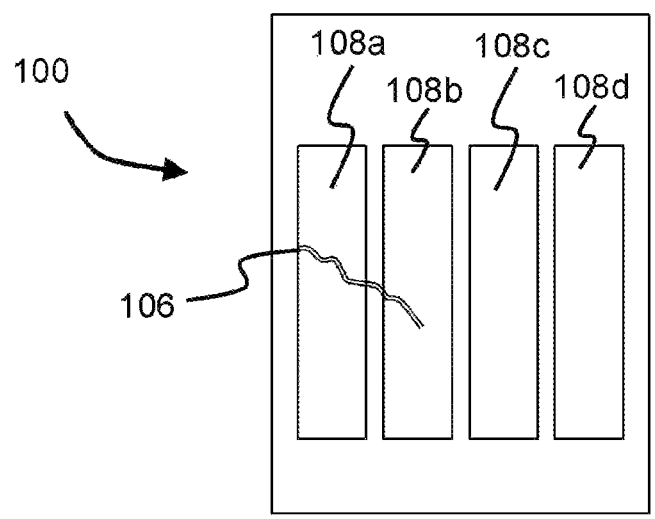

FIG. 2b shows the example of a part 100 shown in FIG. 2a deforming due to a crack 106 forming in the part 100. In this example, the crack 106 has propagated a distance in the part 100 so that the crack 106 passes through an area on which the first sacrificial sensor 108a is coupled with the part 100. In addition, in this example, the crack 106 passes through approximately half of a width of a second sacrificial sensor 108b. The presence of the defect/deformation in the coupling location of the first sacrificial sensor 108a causes damage to the first sacrificial sensor 108a. Further, the presence of the deformation of the coupling location of the second sacrificial sensor 108b causes damage to the second sacrificial sensor 108b.

The electrical properties of a sacrificial sensor 108 change as the sacrificial sensor 108 is subject to stress and/or damaged. In one example, an electric current is passed through the sacrificial sensor 108, for example across a length of a sacrificial sensor 108 between two terminals of the sensor 108, and the change in electrical resistance is measured, either directly or indirectly. In one example, a constant current is applied to the sacrificial sensor 108 and a change in voltage is detected (and measured) as the sacrificial sensor 108 is damaged. In other examples, a constant voltage is applied across the sacrificial sensor 108 and the change in current is detected (and measured) to indicate a change of resistance in the sacrificial sensor 108.

The resistance of a part 100 may be calculated by the following Resistance equation:

$$R=\rho L/A$$

Wherein: R=Resistance; ρ=Resistivity; L=Length; and A=Cross-Sectional Area.

As the sacrificial sensor 108 is damaged, the effective cross-sectional area of the sacrificial sensor 108 will be reduced, thus increasing its resistance value.

Figure 3:
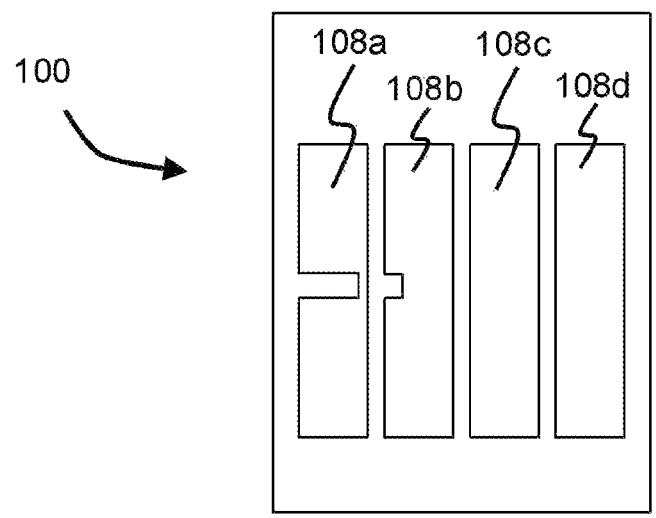
FIG. 3 shows another example of a part with a plurality of sacrificial sensors applied.

FIG. 3 shows an example of damage to sacrificial sensors 108a-d when the part 100 shown in FIG. 2b is damaged or deformed. As shown, a first sacrificial sensor 108a is located at a damage or deformation location and so may be damaged such that a hole is formed across most of the width of the first sacrificial sensor 108a. As a result, the effective cross-sectional area of the first sacrificial sensor is significantly reduced as it is only based on the remaining, connected, section of the first sacrificial sensor 108a. As the effective cross-sectional area of the first sacrificial sensor 108a is reduced, the resistance of the first sacrificial sensor 108a is significantly increased. In some examples, the sacrificial sensor 108 may be damaged across its entire width, which would result in a considerable increase in resistance.

In the example shown in FIGS. 2b and 3, a second sacrificial sensor 108b is also located at a damage or deformation location and so will also be damaged. However, the crack 106 of the part 100 is less prevalent in the region of the second sacrificial sensor 108b and as such there will be less damage done to the second sacrificial sensor 108b compared with the first sacrificial sensor 108a. As shown in FIG. 3, the damage to second sensor 108b is less severe than compared with the first sacrificial sensor 108a. Therefore, the cross-sectional area of the second sacrificial sensor 108b is reduced by a lesser amount than compared with the reduction in cross-sectional area of the first sacrificial sensor 108a. As a result, the resistance of the second sacrificial sensor 108b is increased, but not to the same extent of the first sacrificial sensor 108a. As the defect is more prevalent in the location of the first sacrificial sensor 108a compared with the second sacrificial sensor 108b, then the user could determine that the defect or the damage to the part 100 is more prevalent in the location of the first sacrificial sensor 108a compared with the second sacrificial sensor 108b. Therefore, damage propagation through the part 100 can be tracked, which will inform decisions on whether repairs need to be made.

In other examples, an electrical property of the sacrificial sensor 108 that changes as the sacrificial sensor 108 is damaged is capacitance. For example, the sacrificial sensors 108 may include two substantially parallel plates and the capacitance between the two layers would likely change if damage occurs. In one example, there may be more than one layer of sacrificial sensors 108 such that a metallic/conductive substrate is separated by an adhesive or matrix in a joint. As damage occurs to the sacrificial sensors 108 then the capacitance of the sacrificial sensors 108 will also change, which is indicative of damage to the part 100.

In one example, the sacrificial sensor 108 may be placed on a surface of the part 100 that is being monitored. The sensor 108 may be coupled with the surface of the part 100 via an adhesive or other coupling mechanism that enables the sensor 108 to be damaged as the part 100 deforms.

In an alternative example, the sacrificial sensor 108 is formed within the part 100 itself, i.e. the sacrificial sensor 108 and the part 100 are integral. For example, if the part 100 comprises a composite laminate, then the sacrificial sensor 108 may be located in one layer of the laminated composite part 100. In one example, the sacrificial sensor 108 forms an entire layer of the laminated composite part 100. In one example, the sacrificial sensor is formed in between layers of the laminated composite part 100. In these examples, the sacrificial sensor 108 is located within the matrix of the laminated composite part 100. As the matrix of the laminated composite part 100 will fail before the fibres of the laminated composite part 100, then as the matrix is damaged, then the sacrificial sensor 108 will also be damaged. As the matrix of a laminated composite part 100 will fail before the fibres of the laminated composite part 100, then the provision of a sacrificial sensor 108 enables early detection of a defect.

In this example, one or more terminals of the sacrificial sensor 108 may be exposed from the surface of the part 100 that are suitable for receiving an electric current from an electric power source. However, in other examples current may be applied to the sacrificial sensor 108 via alternative means, e.g. induction.

Sacrificial sensors 108 may be applied to a joint located between parts that are likely to be subject to the highest amount of stress and therefore, likely to deform. High stresses occur in joints as a result of discontinuities in the geometry of the joint of part 100 meaning that these regions are more likely to fail as the stress is often generated transverse to the laminated structure or bond line where the material is weakest. As such, one or more sacrificial sensors 108 may be applied to a region around or within the joint of the part 100. Ata joint, the sacrificial sensor 108 may be applied within the adhesive as this is the most likely to fail first.

By applying sensors 108 at locations that are most likely to fail or suffer deformation, then more useful information can be provided about the integrity of the part 100 and the sensors 108 can be used as an early warning system of possible problems with the part 100. Therefore, a user is able to assess if the damage is critical, e.g. is the damage growing, whether it will cause failure and when will it cause failure. Armed with this information a user can decide if and when maintenance is required, and/or whether operational limits need to be applied etc., potentially avoiding total failure of the structure/component formed of the parts 100.

In use, more than one sacrificial sensor 108 may be applied to the part 100. FIGS. 2a and 2b show an example of a part 100 with four sacrificial sensors 108 applied, but in practice more or fewer than four sensors 108 may be applied to a part 100. The part 100 may be any shape. Providing more sensors 108 to the part 100 will result in a better resolution of the location of any damage and the current state of the integrity of the part 100. In one example, a plurality of sacrificial sensors 108 may be used, in various orientations within the part 100, for example, there may be a plurality of sensors in the through-thickness direction of the part 100.

The sacrificial sensors 108 are modular since they can be coupled with the part 100 in a number of different ways and techniques and, as such, the sacrificial sensors 108 can be used in many different locations in the part 100. The sacrificial sensors 108 may therefore provide a high resolution of the current state of the part 100, identifying localised problems within the part 100.

The sacrificial sensors 108 may take the form of an electrically conductive fibrous material that is inexpensive to produce. In one example, the material of the sacrificial sensor 108 comprises a tissue structure. The tissue structure means that the sacrificial sensors are flexible and so could conform to the shape of any part 100.

The sacrificial sensor 108 may comprise a conductive material that is configured to be damaged during use. In one example, the sacrificial sensor 108 comprises a nickel coated carbon material. In other examples, the sacrificial sensor comprises silver coated nylon fibres. The sacrificial sensor 108 may be manufactured by using traditional paper making processes.

In some examples, the sacrificial sensor 108 has a weight (or areal density) of between approximately 5 to 30 GSM, preferably approximately 10 GSM. The tissue material may be very lightweight and compared with the structure of the part and so will not have a detrimental effect on the strength of the part 100.

In one example, the sacrificial sensor 108 has a low tensile strength and strain to failure value compared to that of the part 100 and any adhesive used. The sacrificial sensor 108 may be configured to become damaged when the strain (deformation) exceeds its strain to failure value.

As the strain to failure of the sacrificial sensor 108 is relatively low, it means that when it is subject to a sufficient strain/deformation then it will become damaged and the electrical properties of the sacrificial sensor 108 will be altered. The electrical properties of the sacrificial sensor 108 may be directly or indirectly monitored and, as such, the damage to the sacrificial sensor can be identified/detected. As the sacrificial sensor 108 is damaged as the part 100 is deformed, then the sacrificial sensor 108 is able to detect/indicate damage to the part 100, by exhibiting a change to an electrical property, such as resistance, of the sacrificial sensor 108. An electrical property of the sacrificial sensor 108, such as resistance, may be altered as a load is applied to a part 100 (or at least the conductive layer in the laminate). Therefore, the sacrificial sensors 108 may indicate the level of strain applied to the part 100 and the measurement of the change in electrical properties may be used to capture the magnitude of the strain and the stress-cycles of the material to anticipate fatigue.

In one example, the at least one sacrificial sensor 108 has a lower strain to failure value than the strain to failure value of the part 100 with which the at least one sacrificial sensor 108 is coupled. The sacrificial sensor 108 may be located within the matrix of a composite laminate part 100 or within an adhesive 112 coupled to a part 100. In this example, the matrix of the composite laminate part 100 or the adhesive 112 will effectively support the sacrificial sensor 108. However, as the matrix or the adhesive 112 is damaged, e.g. through the application of load or impact damage, then the sacrificial sensor 108 will become damaged as the part 100 is damaged because the sacrificial sensor 108 has a lower strain to failure value compared with the strain to fail value of the part 100. Effectively, as the matrix or adhesive 112 is damaged, they will no longer provide adequate support to the sensor 108.

In this example, as the sacrificial sensor 108 has a lower strain to failure value compared with the part 100, then the sacrificial sensor 108 will become damaged as the part 100 is damaged. In one example, the sacrificial sensor 108 is damaged as the part 100 develops a defect or changes in shape. Therefore, the sacrificial sensor 108 provides an early warning system that may indicate that a part 100 is damaged. This may occur before visible (or other detectable) signs are apparent.

In one example, a plurality of sacrificial sensors 108 are arranged at various locations (and optionally various orientations) around or within the part 100 to determine the location of any damage of the part 100. For example, a change in electrical resistance of one or more of the sacrificial sensors 108 may be greatest in one sensor 108 at an area on the part 100, which indicates that this area of the part 100 is experiencing more strain as a consequence of the damage and/or is subject to the most deformation.

The part 100 being measured may comprise a laminated composite material and at least one sacrificial sensor 108 located in a laminar layer of the laminated composite part 100.

At least one sacrificial sensor 108 may be located at a joint in the part 100, which is often subject relatively high localised transverse stress within the part 100 compared with the rest of the part 100.

Figure 4:
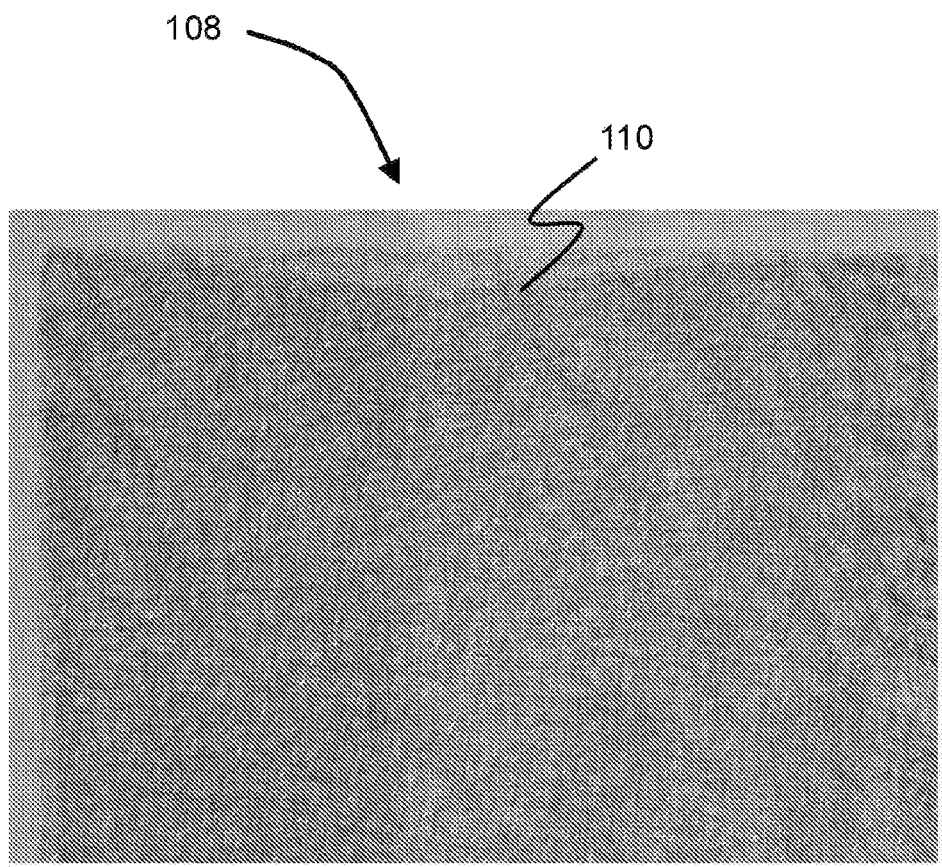
FIG. 4 shows another example of a part with a plurality of sacrificial sensors applied.

FIG. 4 shows an example of a sacrificial sensor 108 material. In this example, the sacrificial sensor 108 comprises a plurality of fibres formed in a tissue like structure.

Figure 5:
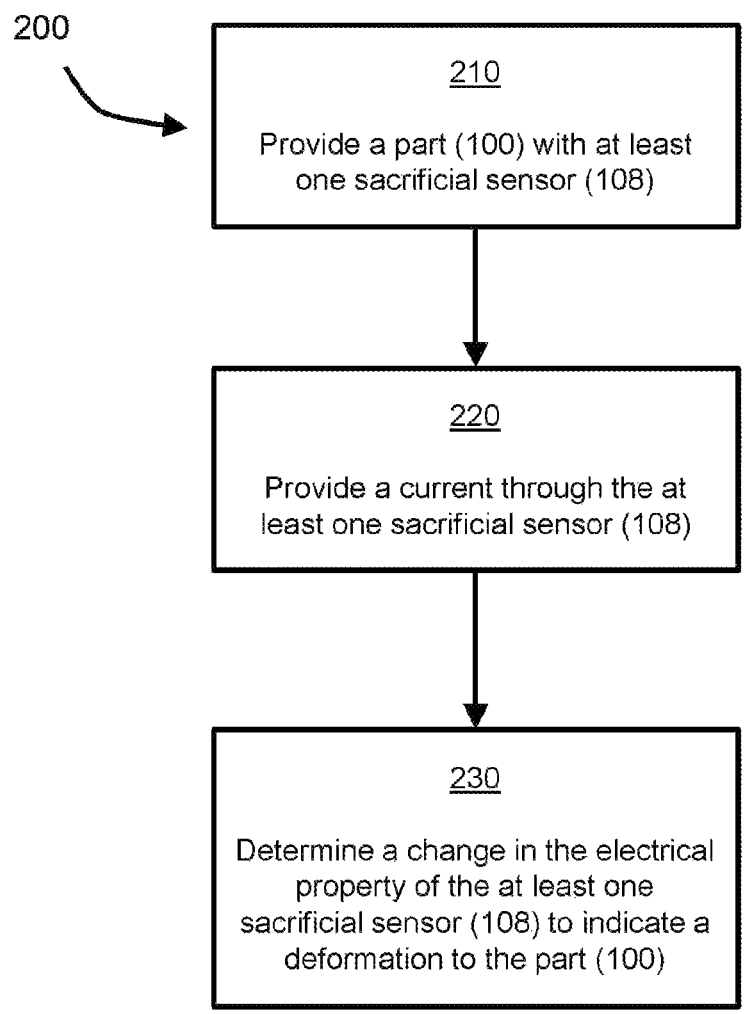
FIG. 5 shows a flow chart for an example method of providing an indication of deformation in a part.

FIG. 5 shows an example of a method 200 of providing an indication of deformation in a part 100. In step 210 a part 100 is provided with at least one sacrificial sensor 108. At least one sacrificial sensor 108 may be coupled to the part 100 by being an integral part of the part 100 or alternatively be coupled to a surface of the part 100.

In step 220 a current is provided through the at least one sacrificial sensor 108. At least one sacrificial sensor 108 may have a plurality of associated terminals through which the current may be provided to the sensors 108.

In step 230 a change in the electrical property of at least one sensor is determined to indicate a deformation to the part 100. In one example, the electrical property is resistance. In another example, the electrical property is capacitance and in a further example, both resistance and capacitance may be measured.

In the example of the electrical property being resistance, a constant current may be applied to the sacrificial sensor 108 and the changes to the voltage across the sacrificial sensor may be measured, indicating a change in resistance of the sacrificial sensor 108. In another example, a constant voltage may be applied across the sacrificial sensor 108 and the current is measured. In this case, changes to the current reflect changes to the resistance of the sacrificial sensor 108. In both cases, changes to the resistance in the sacrificial sensor 108 may be calculated, which indicate damage to the sacrificial sensor 108, which in turn indicates a deformation (and potential damage) of the part 100.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A sensor system configured to be coupled with a part and provide an indication of damage in the part, the sensor system comprising a plurality of sacrificial sensors arranged across a surface of the part, such that the sacrificial sensors are spaced from one another on the surface, each of the plurality of sacrificial sensors comprising a separate and distinct plurality of electrically conductive, flexible fibers in a tissue structure, wherein an electrical property of a given sacrificial sensor of the plurality of sacrificial sensors changes as at least a portion of the given sacrificial sensor is physically broken to indicate damage to the part.

2. The sensor system according to claim 1, wherein the electrical property comprises electrical resistance, wherein the electrical resistance increases as the given sacrificial sensor is damaged.

3. The sensor system according to claim 1, wherein the electrical property comprises capacitance.

4. The sensor system according to claim 1, wherein the plurality of sacrificial sensors is located within an adhesive coupled to the part.

5. The sensor system according to claim 1, wherein the plurality of sacrificial sensors is configured to be integral within the part.

6. The sensor system according to claim 1, wherein the given sacrificial sensor has an areal density of between approximately 5 gsm and approximately 30 gsm.

7. A system comprising:
a part to be inspected; and
the sensor system according to claim 1, wherein one or more of the plurality of sacrificial sensors has a lower strain to failure value compared with a strain to failure value of the part.

8. The system according to claim 7, wherein the one or more of the plurality of sacrificial sensors includes a plurality of sacrificial sensors arranged at various locations on the part to determine the location of any damage of the part.

9. The system according to claim 7, wherein the part comprises a non-conductive composite laminated material.

10. The system according to claim 9, wherein the one or more of the plurality of sacrificial sensors is located in a laminar layer of the composite laminated material.

11. The system according to claim 9, wherein the one or more of the plurality of sacrificial sensors is located in a matrix of the composite laminated material.

12. The system according to claim 8, wherein the one or more of the plurality of sacrificial sensors is located within an adhesive at a joint in the part.

13. A method of providing an indication of damage in a part, the method comprising:
providing a part with the sensor system according to claim 1;
providing a voltage potential to the given sacrificial sensor; and
determining a change in the electrical property of the given sacrificial sensor to indicate damage to the part.

14. A sensor system configured to be coupled with a part and provide an indication of damage in the part, the sensor system comprising a plurality of sacrificial sensors arranged across a surface of the part, such that the sacrificial sensors are spaced from one another on the surface, each of the plurality of sacrificial sensors comprising a separate and distinct plurality of electrically conductive, flexible fibers in a tissue structure, wherein an electrical property of a given sacrificial sensor of the plurality of sacrificial sensors changes as the given sacrificial sensor is physically broken to indicate damage to the part, wherein the sensor system is one of (1) located within an adhesive coupled to the part or (2) integral within the part.

15. The sensor system according to claim 14, wherein the electrical property comprises electrical resistance, capacitance, or both.

16. A system comprising:
a part comprising a non-conductive composite laminated material; and
a sacrificial sensor arranged on a surface of the part, the sacrificial sensor comprising a plurality of electrically conductive, flexible fibers in a tissue structure and is configured to provide an indication of damage in the part, wherein an electrical property of the sacrificial sensor changes as the sacrificial sensor is physically broken to indicate damage to the part.

17. The system according to claim 16, wherein the sacrificial sensor is located in one of (1) a laminar layer of the composite laminated material, (2) a matrix of the composite laminated material, or (3) an adhesive at a joint in the part.

18. The sensor system according to claim 1, wherein the plurality of sacrificial sensors are rectangular strips spaced adjacent to one another across the surface of the part.

19. The sensor system according to claim 14, wherein the plurality of sacrificial sensors are rectangular strips spaced adjacent to one another across the surface of the part.

20. The system according to claim 16, wherein the sacrificial sensor is a rectangular strip on the surface of the part.

* * * * *